United States Patent
Kanno et al.

(10) Patent No.: US 12,465,315 B2
(45) Date of Patent: Nov. 11, 2025

(54) X-RAY DIAGNOSIS APPARATUS AND X-RAY CONDITION SETTING METHOD

(71) Applicant: CANON MEDICAL SYSTEMS CORPORATION, Otawara (JP)

(72) Inventors: Yusuke Kanno, Nasushiobara (JP); Yoshiyasu Hayashi, Nasushiobara (JP); Akio Tetsuka, Shioya (JP); Tomukazu Ono, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 218 days.

(21) Appl. No.: 18/054,796

(22) Filed: Nov. 11, 2022

(65) Prior Publication Data
US 2023/0148985 A1    May 18, 2023

(30) Foreign Application Priority Data
Nov. 16, 2021    (JP) ................ 2021-186197

(51) Int. Cl.
| | |
|---|---|
| *A61B 6/50* | (2024.01) |
| *A61B 6/00* | (2006.01) |
| *A61B 6/04* | (2006.01) |
| *A61B 6/12* | (2006.01) |
| *G06T 7/70* | (2017.01) |

(52) U.S. Cl.
CPC ............ *A61B 6/545* (2013.01); *A61B 6/0407* (2013.01); *A61B 6/12* (2013.01); *A61B 6/541* (2013.01); *G06T 7/70* (2017.01); *G06T 2207/10116* (2013.01); *G06T 2207/30021* (2013.01); *G06T 2207/30052* (2013.01); *G06T 2207/30096* (2013.01); *G06T 2207/30101* (2013.01); *G06T 2207/30204* (2013.01)

(58) Field of Classification Search
CPC .......... A61B 6/545; A61B 6/0407; G06T 7/70
See application file for complete search history.

(56) References Cited

U.S. PATENT DOCUMENTS

| | | | | |
|---|---|---|---|---|
| 2005/0249391 | A1* | 11/2005 | Kimmel | ................ G06T 7/143 |
| | | | | 382/128 |
| 2009/0080724 | A1* | 3/2009 | Nanbu | ..................... G06T 5/20 |
| | | | | 382/128 |

(Continued)

FOREIGN PATENT DOCUMENTS

| | | |
|---|---|---|
| JP | 2014-33813 A1 | 2/2014 |
| JP | 2016-034451 A | 3/2016 |
| WO | WO 2020/042962 A1 | 3/2020 |

OTHER PUBLICATIONS

Japanese Office Action dated Aug. 6, 2026. Issued in Japanese Patent Application No. 2021-186197 (with English translation; Documents 1, 15 and 16 cited therein).

*Primary Examiner* — Hugh Maupin
(74) *Attorney, Agent, or Firm* — Oblon, McClelland, Maier & Neustadt, L.L.P.

(57) ABSTRACT

An X-ray diagnosis apparatus according to an embodiment includes a processing circuitry. The processing circuitry is configured: to determine a region corresponding to a target object in an X-ray image, on the basis of the X-ray image; to calculate a statistical value related to the region, on the basis of a plurality of pixel values included in the region; and to set an X-ray condition related to generating X-rays, on the basis of the statistical value.

17 Claims, 4 Drawing Sheets

(56) References Cited

U.S. PATENT DOCUMENTS

| | | | |
|---|---|---|---|
| 2014/0037167 A1* | 2/2014 | Shirahata | A61B 5/748 |
| | | | 382/128 |
| 2014/0341350 A1* | 11/2014 | Muroi | A61B 6/504 |
| | | | 378/62 |
| 2015/0161790 A1* | 6/2015 | Takahashi | G06T 7/0012 |
| 2015/0317771 A1* | 11/2015 | Kato | G06T 5/10 |
| | | | 378/62 |
| 2015/0356734 A1* | 12/2015 | Ooga | A61B 6/486 |
| | | | 382/131 |
| 2016/0206274 A1 | 7/2016 | Kang et al. | |
| 2017/0295300 A1* | 10/2017 | Esashi | A61B 6/5241 |
| 2020/0222018 A1* | 7/2020 | van Walsum | A61B 6/5264 |
| 2021/0022617 A1* | 1/2021 | Zhao | A61B 6/507 |

\* cited by examiner

X-RAY DIAGNOSIS APPARATUS AND X-RAY CONDITION SETTING METHOD

CROSS-REFERENCE TO RELATED APPLICATIONS

This application is based upon and claims the benefit of priority from Japanese Patent Application No. 2021-186197, filed on Nov. 16, 2021, the entire contents of which are incorporated herein by reference.

FIELD

Embodiments described herein relate generally to an X-ray diagnosis apparatus and an X-ray condition setting method.

BACKGROUND

Conventionally-known schemes for controlling brightness levels in X-ray diagnosis apparatuses include Auto Brightness Control (ABC) schemes. An ABC scheme controls X-ray conditions so as to maintain balance between optimal image quality and radiation exposure in accordance with the thickness of the body of an examined subject, while a Region of Interest (hereinafter, "ROI") is uniformly set in the entire region of an X-ray image. This scheme is able to realize X-ray control with a setting of the optimal X-ray conditions, while the radiation exposure and the image quality are in balance with each other.

However, according to the conventional ABC scheme, there may be some situations where an optimal radiation exposure amount cannot be balanced with image quality, when it is impossible to set the optimal X-ray conditions because the X-ray image renders a manipulation implemented on the examined subject or an object having a high X-ray absorption rate, for example. In those situations, the patient may be irradiated with X-rays in an excessive dose, or sufficient image quality may not be achieved.

DETAILED DESCRIPTION

An X-ray diagnosis apparatus according to an embodiment includes a processing circuitry. The processing circuitry is configured: to determine a region corresponding to a target object in an X-ray image, on the basis of the X-ray image; to calculate a statistical value related to the region, on the basis of a plurality of pixel values included in the region; and to set an X-ray condition related to generating X-rays, on the basis of the statistical value.

Exemplary embodiments of an X-ray diagnosis apparatus and an X-ray condition setting method will be explained below, with reference to the accompanying drawings. In the following embodiments, some of the constituent elements referred to by using the same reference characters are assumed to perform the same or similar operations, and duplicate explanations thereof will be omitted as appropriate.

EMBODIMENTS

Figure 1:
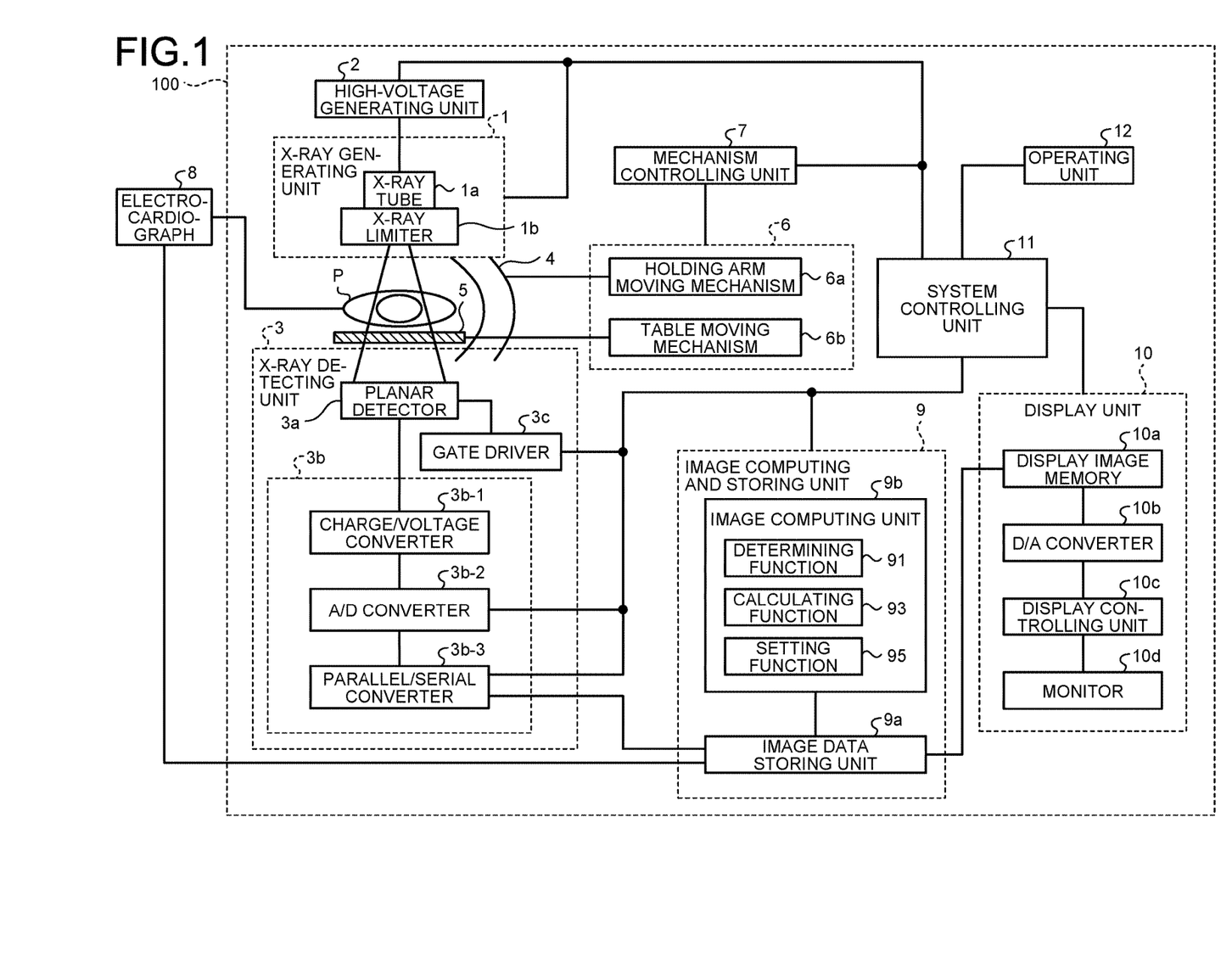
FIG. 1 is a diagram illustrating an exemplary configuration of an X-ray diagnosis apparatus according to an embodiment.

FIG. 1 is a diagram illustrating an exemplary configuration of an X-ray diagnosis apparatus 100 according to an embodiment of the present disclosure. The X-ray diagnosis apparatus 100 includes an X-ray generating unit 1, a high-voltage generating unit 2, an X-ray detecting unit 3, a holding arm 4, a table 5, a mechanism unit 6, a mechanism controlling unit 7, an electrocardiograph 8, an image computing and storing unit 9, a display unit 10, a system controlling unit 11, and an operating unit 12.

The X-ray generating unit 1 is configured to generate X-rays. For example, the X-ray generating unit 1 includes an X-ray tube 1a and an X-ray limiter 1b. The X-ray tube 1a is a vacuum tube configured to generate the X-rays by causing thermo electrons to be emitted from a negative pole (a filament) toward a positive pole (a target or an anode), with application of high voltage and a supply of a filament current from the high-voltage generating unit 2. As a result of the thermo electrons colliding with the target, the X-rays are generated. For instance, examples of the X-ray tube 1a include an X-ray tube of an anode rotating type configured to generate the X-rays by having the thermo electrons emitted onto a rotating anode. However, applicable types of the X-ray tube 1a are not limited to the rotating anode type. It is acceptable to use an X-ray tube of an arbitrary type.

The X-ray limiter 1b is configured to form an X-ray emission field of the X-ray tube 1a. The X-ray limiter 1b is provided on the front face of an X-ray emission window of the X-ray tube 1a. For example, the X-ray limiter 1b includes four limiting blades structured by using metal plates of lead or the like. The limiting blades are driven by a driving device (not illustrated) in accordance with a region of interest input by an operator via the operating unit 12 and/or an input interface. By causing the driving device to slide the limiting blades, the X-ray limiter 1b is configured to adjust a region shielded from the X-rays to have an arbitrary size. By using the adjusted limiting blades, the X-ray limiter 1b is configured to block the X-rays outside an aperture region. As a result, the X-ray limiter 1b is configured to limit the X-rays generated by the X-ray tube 1a so as to be emitted onto the region of interest of an examined subject (hereinafter, "patient") P.

The high-voltage generating unit 2 includes electrical circuits such as a transformer and a rectifier, as well as a high-voltage generating device and an X-ray controlling device. The high-voltage generating unit 2 has a function of generating the high voltage to be applied to the X-ray tube 1a and the filament current to be supplied to the X-ray tube 1a. The X-ray controlling device is configured to control output voltage corresponding to the X-rays to be emitted by the X-ray tube 1a. The high-voltage generating unit 2 may be of a transformer type or an inverter type. Further, the high-voltage generating unit 2 may be provided on the holding arm 4.

The X-ray detecting unit 3 is configured to detect the X-rays generated by the X-ray tube 1a. For example, the X-ray detecting unit 3 includes a planar detector 3a corresponding to an X-ray detector, an image data generating unit 3b, and a gate driver 3c. For example, the planar detector 3a is realized by using a Flat Panel Detector (hereinafter, "FPD"). The FPD includes a plurality of semiconductor detecting elements. Examples of the semiconductor detecting elements include those of a direct conversion type configured to directly convert the X-rays into an electrical signal and those of an indirect conversion type configured to convert the X-rays into light via fluorescence and to further convert the light into an electrical signal. The FPD may be of either type. The electrical signal generated by the FPD is output to the image data generating unit 3b.

The image data generating unit 3b is structured with a charge/voltage converter 3b-1, an Analog-to-Digital (A/D) converter 3b-2, and a parallel/serial converter 3b-3. The charge/voltage converter 3b-1 is configured to convert the electrical signal output from the planar detector 3a into a voltage signal and to output the voltage signal to the A/D converter 3b-2. The A/D converter 3b-2 is configured, under control of the system controlling unit 11, to convert the voltage signal converted from the electrical signal into X-ray image data realized as digital data and to output the X-ray image data to the parallel/serial converter 3b-3. The parallel/serial converter 3b-3 is configured, under the control of the system controlling unit 11, to convert the X-ray image data resulting from the A/D conversion from parallel data into serial data and output the serial data to the image computing and storing unit 9.

The gate driver 3c is configured, under the control of the system controlling unit 11, to drive the detecting elements in the planar detector 3a.

The holding arm 4 is configured to movably hold the X-ray tube 1a that generates the X-rays and the planar detector 3a that is positioned opposite the X-ray tube 1a and that detects the X-rays. In other words, the X-ray tube 1a and the planar detector 3a are attached to end parts of the holding arm 4 while being positioned opposite each other. The holding arm 4 is configured to rotatably support the X-ray limiter 1b and the planar detector 3a, while using, as a rotation axis, a straight line connecting a focal point where the X-rays are generated by the X-ray tube 1a to a central part of the planar detector 3a. The holding arm 4 is configured to rotate the X-ray limiter 1b and the planar detector 3a on the rotation axis, with operations of a holding arm moving mechanism 6a. In this situation, the holding arm 4 may be configured to hold the X-ray generating unit 1 and the X-ray detecting unit 3 while a Source Image Distance (hereinafter, "SID") is variable, for example.

The table 5 includes a tabletop and a base. The tabletop has the patient P placed thereon. For example, the base is configured to support the tabletop so as to be able to make parallel movements in long-axis directions of the tabletop, short-axis directions of the tabletop, and vertical directions, or the like. Further, the base is configured to rotatably support the tabletop, while using the long-axis direction of the tabletop, the short-axis direction of the tabletop, and the vertical direction or the like as rotation axes.

The mechanism unit 6 includes the holding arm moving mechanism 6a and a table moving mechanism 6b. For example, the holding arm moving mechanism 6a and the table moving mechanism 6b are realized by using a motor, an actuator, and/or the like. Under the control of the mechanism controlling unit 7, the holding arm moving mechanism 6a is configured to move the holding arm 4 to a position designated by a user or set in advance. Under the control of the mechanism controlling unit 7, the table moving mechanism 6b is configured to move the tabletop of the table 5 to a position designated by the user or set in advance.

Under the control of the system controlling unit 11, the mechanism controlling unit 7 is configured to control the mechanism unit 6. For example, on the basis of an input operation received from the operator via the operating unit 12, the mechanism controlling unit 7 is configured to control the moving operations of the holding arm moving mechanism 6a and the moving operations of the table moving mechanism 6b. More specifically, the mechanism controlling unit 7 is configured to read a mechanism controlling program stored in storage, to load the read program into a memory within a processor of the mechanism controlling unit 7, and to control the moving operations of the holding arm moving mechanism 6a and the moving operations of the table moving mechanism 6b according to the loaded mechanism controlling program.

The electrocardiograph 8 is configured to measure temporal changes in action potential of the heart of the patient P and to output electrocardiographic phases serving as a measurement result to the image computing and storing unit 9. Although the electrocardiograph 8 is provided outside the X-ray diagnosis apparatus 100 in the present example, the electrocardiograph 8 may be provided in the X-ray diagnosis apparatus 100. Further, when there is no need to acquire the electrocardiographic phases of the patient P, the electrocardiograph 8 may be omitted, as appropriate. Alternatively, a plethysmograph or the like may be used in place of the electrocardiograph 8.

The image computing and storing unit 9 includes an image data storing unit 9a and an image computing unit 9b. The image data storing unit 9a is configured by using a hard disk drive (HDD), a semiconductor memory, or the like. The image data storing unit 9a is configured to store therein the X-ray image data output from the image data generating unit 3b. In that situation, the image data storing unit 9a may store therein the X-ray image data so as to be kept in association with the electrocardiographic phases output from the electrocardiograph 8.

The image computing unit 9b is configured to generate an X-ray image to be displayed, by performing an amplifying process, an image computing process, and/or the like on the X-ray image data stored in the image data storing unit 9a. In this situation, the image computing unit 9b may bring the generated X-ray image into association with the electrocardiographic phases output from the electrocardiograph 8. Further, under the control of the system controlling unit 11, the image computing unit 9b is configured to output the X-ray image stored in the image data storing unit 9a to a display image memory 10a of the display unit 10, in accordance with an instruction from the operator to have the image displayed or the like.

The image computing unit 9b includes a determining function 91, a calculating function 93, and a setting function 95. The image computing unit 9b realizing the determining function 91, the calculating function 93, and the setting function 95 corresponds to a determining unit, a calculating unit, and a setting unit. On the basis of an X-ray image, the determining function 91 is configured to determine a region corresponding to a target object (hereinafter, "target region") in the X-ray image. For example, the determining function 91 is configured to determine the target region in the X-ray image, by performing any of various types of image processing processes such as various types of segmentation processes, an image recognition process, or a trained model trained to realize an image recognition process and a segmentation process (e.g., a trained neural network that realizes a semantic segmentation).

More specifically, the determining function 91 is configured to determine the target region from among a plurality of sections divided in advance in the X-ray image. For example, the plurality of sections correspond to a plurality of divided regions obtained by dividing the area of the X-ray image into grid-like sections of n×m (where n and m are each a natural number of 2 or larger). Because the plurality of sections are obtained by dividing the X-ray image, the plurality of sections include a plurality of pixels. Each of the plurality of sections corresponds to a unit that unitarily handles weights (explained later) with respect to the plurality of pixels included in the section. In the description below, to explain a specific example, it is assumed that the plurality of sections are a plurality of divided regions obtained by dividing the area of the X-ray image into grid-like sections of 5×5.

For example, the target object may be a catheter. In this situation, the determining function 91 is configured to determine the region (the target region) in which the catheter is present from among the plurality of sections, by performing an image processing process on the X-ray image. In addition, the determining function 91 is configured to further determine a region including the tip end of the catheter within the target region, by performing an image processing process on the X-ray image or the target region. The determining function 91 is configured to determine, within the X-ray image, a region (hereinafter, "high absorption region") corresponding to a high absorption object that overlaps with the target object in the X-ray image and that has an X-ray absorption rate higher than a predetermined X-ray absorption rate. The predetermined X-ray absorption rate may be, for example, an X-ray absorption rate related to teeth, a bone, or any of various types of devices (e.g., a pacemaker, a Transesophageal Echocardiography (TEE) probe, an artificial joint, etc.) placed in the body of the patient.

When the high absorption object is a bone or teeth, the determining function 91 is configured to determine the high absorption region, by performing a detecting process based on an anatomical observation on the X-ray image. In contrast, when the high absorption object is any of the various types of devices, the determining function 91 is configured to determine the high absorption region by performing a recognition process of the device on the X-ray image. For example, when the high absorption object is a TEE probe, the high absorption region may be determined on the basis of a fusion image of the X-ray image and an echo (ultrasound) image. For the recognition process and the detecting process related to the high absorption object, because it is possible to use any of existing methods as appropriate, explanations thereof will be omitted.

Further, the determining function 91 may be configured to re-determine the region corresponding to the target object, in response to moving of one or both of the holding arm 4 and the tabletop. More specifically, in response to receipt of a moving instruction output from either the mechanism controlling unit 7 or the system controlling unit 11 to the mechanism unit 6, the determining function 91 may re-determine the region corresponding to the target object, by performing an image processing process on the X-ray image.

The calculating function 93 is configured to calculate a statistical value related to the region corresponding to the target object, on the basis of a plurality of pixel values included in the determined region corresponding to the target object. For example, the calculating function 93 may be configured to calculate the statistical value, by using determined weights that gradually decrease from the tip end of the catheter to the base end of the catheter. More specifically, among the plurality of sections, the calculating function 93 is configured to set the section (hereinafter, "tip end section") where the tip end of the catheter is positioned with a maximum weight (e.g., a weight of 1) and to set the section (hereinafter, "base end section") positioned at the base end of the catheter with a minimum weight (e.g., a weight of 0). In other words, the calculating function 93 is configured to apply the maximum weight to the plurality of pixels included in the tip end section and to apply the minimum weight to the plurality of pixels included in the base end section. Further, in the region corresponding to the catheter, the calculating function 93 is configured to set weights for the range from a section positioned adjacent to the tip end section to a section positioned adjacent to the base end section, in such a manner that the weights applied to the sections gradually decrease from the tip end section toward the base end section.

To explain a specific example below, the weights shall be expressed as ratios of 0 to 1. However, the weights do not necessarily have to be expressed with the ratios of 0 to 1 and may be set as appropriate. Further, the weight setting process may be realized by a function (e.g., a weight setting function) different from the calculating function 93.

For example, the calculating function 93 is configured to calculate the statistical value by using Expression (1) presented below. As indicated in Expression (1), the statistical value corresponds to a weighted average value. It should be noted that, as for Expression (1), the plurality of pixel values that belong to any section being set with a weight of 0 are excluded from the calculation using Expression (1).

$$\sum_{i \in ROI} w_i p_i / \sum_{i \in ROI} w_i \tag{1}$$

In Expression (1), the subscript "i" is an argument indicating a pixel. Further, in Expression (1), "ROI" denotes a region (hereinafter, "calculation region") obtained by excluding any region having a weight of 0 and the high absorption region from the target region in the X-ray image. In other words, among the plurality of sections, the ROI is a region that includes the target object but does not include the regions having a weight of 0 or the high absorption region and that has been determined as surroundings of the target object. In Expression (1), "$w_i$" denotes a weight coefficient for an i-th pixel, i.e., a weight coefficient assigned to the section to which the i-th pixel belongs. Further, in Expression (1), "$p_i$" denotes the pixel value of the i-th pixel. The calculating function 93 is configured to calculate the statistical value by using Expression (1), while excluding the region related to the high absorption object from the region related to the target object.

In this situation, when one or both of the holding arm 4 and the tabletop have moved, the calculating function 93 may be configured to re-calculate the statistical value, on the basis of the plurality of pixel values included in the re-determined region, in response to the moving of the one or both of the holding arm 4 and the tabletop.

On the basis of the calculated statistical value, the setting function 95 is configured to set X-ray conditions related to generating the X-rays. The X-ray conditions denote an X-ray tube voltage kV applied to the X-ray tube 1a, the product (X-ray tube current-time product mAs) of the X-ray tube current supplied to the X-ray tube 1a and an X-ray emission time period, and the like. For example, the setting function 95 is configured to compare the statistical value with a threshold value. For example, the threshold value is stored in advance in a memory in the image computing unit 9b. Further, the threshold value may be set, changed, or adjusted as appropriate according to an instruction received from the user via the operating unit 12. The setting function 95 is configured to compare the statistical value with the threshold value. On the basis of a result of the comparison between the statistical value and the threshold value, the setting function 95 is configured to set the X-ray conditions. The setting function 95 is configured to output the set X-ray conditions to the system controlling unit 11. For example, the X-ray condition setting process corresponds to adjusting (hereinafter, "ABC scheme") one or both of the X-ray tube voltage kV and the X-ray tube current-time product mAs in the X-ray conditions related to the X-ray image. For the adjustment of the X-ray conditions in the ABC scheme, because it is possible to use any of various types of known methods, explanations thereof will be omitted.

The display unit 10 includes the display image memory 10a, a Digital-to-Analog (D/A) converter 10b, a display controlling unit 10c, and a monitor 10d. The display image memory 10a is configured to store therein the image data output from the image data storing unit 9a and to output any of the stored image data to the D/A converter 10b. The D/A converter 10b is configured to convert the image data output from the display image memory 10a into an analog signal and to output the analog signal to the display controlling unit 10c. The display controlling unit 10c is configured to cause the monitor 10d to display an X-ray image based on the image data that was output from the D/A converter 10b.

In this situation, the display unit 10 may be realized as a display device. In that situation, as the display device, for example, it is possible to use a Liquid Crystal Display (LCD) device, a Cathode Ray Tube (CRT) display device, an Organic Electroluminescence Display (OELD) device, a plasma display device, or other arbitrary display devices, as appropriate. Further, the display device may be of a desktop type or may be configured by using a tablet terminal or the like capable of wirelessly communicating with the system controlling unit 11 and the image computing and storing unit 9. Further, when the monitor 10d is configured to display the X-ray image as digital data, the D/A converter 10b is not necessary.

On the basis of an input operation received from the operator via the operating unit 12, the system controlling unit 11 is configured to control the X-ray generating unit 1, the high-voltage generating unit 2, the gate driver 3c, the A/D converter 3b-2, the parallel/serial converter 3b-3, the mechanism controlling unit 7, the image computing and storing unit 9, the display unit 10, and the like. More specifically, the system controlling unit 11 is configured to read a system controlling program, to load the read system controlling program into a memory thereof, and to control the functional units in the X-ray diagnosis apparatus 100 according to the loaded controlling program.

The operating unit 12 is configured to receive various types of input operations from the operator, to convert the received input operations into electrical signals, and to output the electrical signals to the system controlling unit 11.

For example, the operating unit 12 is realized by using an input interface. The operating unit 12 is configured to receive, from the operator, an operation to cause one or both of the holding arm 4 and the table 5 into operation, the X-ray conditions related to generating the X-rays, conditions related to the image processing processes performed by the image computing unit 9b, and the like. As the operating unit 12, for example, it is possible to use any of the following as appropriate: a mouse, a keyboard, a trackball, a switch, a button, a joystick, a foot switch, a touchpad, a touch panel display device, and the like. For example, the operating unit 12 is installed in a console device provided in a control room different from an examination room. Alternatively, the operating unit 12 may be provided on the holding arm 4 or the like.

Further, in the present embodiment, the operating unit 12 does not necessarily need to include physical operation component parts such as the mouse, the keyboard, the trackball, the switch, the button, the joystick, the touchpad, the touch panel display device, and/or the like. For instance, possible examples of the operating unit 12 include an electrical signal processing circuitry configured to receive an electrical signal corresponding to an input operation from an external input device provided separately from the apparatus and to output the electrical signal to the system controlling unit 11. Further, the operating unit 12 may be configured by using a tablet terminal or the like capable of wirelessly communicating with the system controlling unit 11.

A processing circuitry configured to realize the mechanism controlling unit 7, the image computing unit 9b, the system controlling unit 11, and the like described above includes, as hardware resources thereof, a processor such as a Central Processing Unit (CPU), a Micro Processing Unit (MPU), or a Graphics Processing Unit (GPU), and memory elements such as a Read-Only Memory (ROM), a Random Access Memory, and/or the like.

Various types of functions implemented by the processor are stored in a memory (not illustrated) in the form of computer-executable programs. The processor is a processor configured to realize the functions corresponding to the programs, by reading and executing the programs from the memory. In other words, a plurality of circuits that have read the programs have the functions corresponding to the programs.

For example, the processing circuitry realizing the image computing unit 9b is configured to implement the determining function 91, the calculating function 93, and the setting function 95, by employing the processor configured to execute the programs loaded into the memory. The processing circuitry implementing the determining function 91, the calculating function 93, and the setting function 95 corresponds to a determining unit, a calculating unit, and a setting unit, respectively. Further, the determining function 91, the calculating function 93, and the setting function 95 do not necessarily have to be realized with the single processing circuitry. It is also acceptable to structure a processing circuitry by combining together a plurality of independent processors so as to realize the determining function 91, the calculating function 93, and the setting function 95 as a result of the processors executing the programs.

Further, the processing circuitry realizing the image computing unit 9b may be realized by using an Application Specific Integrated Circuit (ASIC), a Field Programmable Gate Array (FPGA), or other processors such as a Complex Programmable Logic Device (CPLD) or a Simple Programmable Logic Device (SPLD).

An overall configuration of the X-ray diagnosis apparatus 100 according to the embodiment has thus been explained. The X-ray diagnosis apparatus 100 according to the embodiment structured as described above is configured to perform the process (hereinafter, X-ray condition setting process) of setting the X-ray conditions on the basis of the X-ray image. The X-ray condition setting process is a process performed by employing the determining function 91, the calculating function 93, and the setting function 95 to determine the target region in the X-ray image on the basis of the X-ray image, to calculate the statistical value related to the region on the basis of the plurality of pixel values included in the determined target region, and to set the X-ray conditions related to generating the X-rays on the basis of the calculated statistical value. The X-ray condition setting process corresponds to the ABC scheme having technical characteristics according to the present embodiment.

Figure 2:
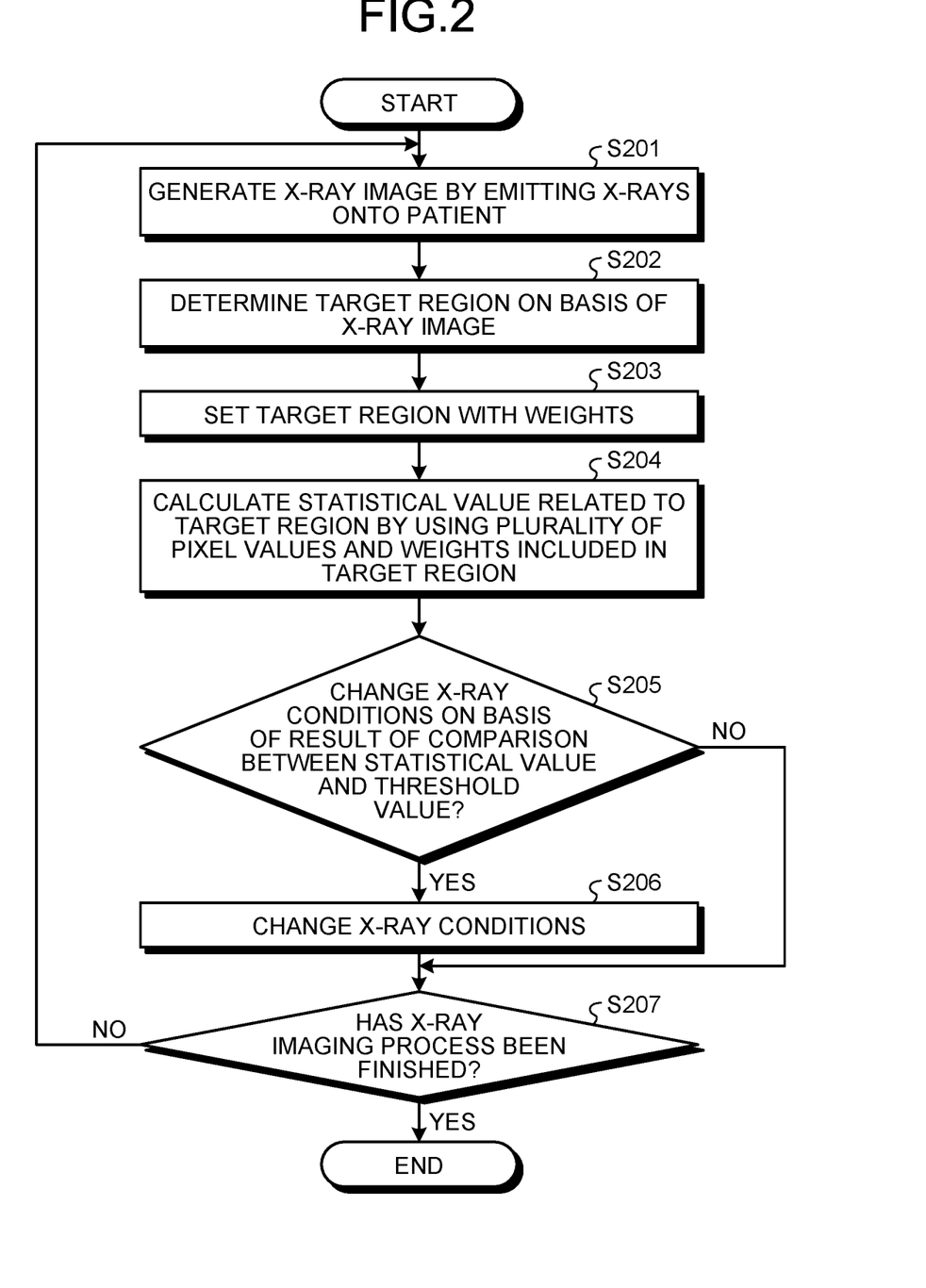
FIG. 2 is a flowchart illustrating an example of a procedure in an X-ray condition setting process according to the embodiment.

In the description below, a procedure in the X-ray condition setting process will be explained with reference to FIG. 2. FIG. 2 is a flowchart illustrating an example of the procedure in the X-ray condition setting process. To explain a specific example, it will be assumed that the target object is a catheter.

X-Ray Condition Setting Process

Step S201:

The system controlling unit 11 controls the various units in the X-ray diagnosis apparatus 100 so as to perform an imaging process using X-rays on the patient P. For example, the imaging process in the present embodiment is applicable to either one of the following: a one-shot imaging process (X-ray imaging) by which X-rays of a high dose are emitted onto the patient P; and fluoroscopy by which X-rays of a low dose are emitted onto the patient P continually or intermittently.

The high-voltage generating unit 2 generates the high voltage according to the set X-ray conditions and applies the generated high voltage to the X-ray tube 1a. In addition, the high-voltage generating unit 2 supplies the X-ray tube current to the X-ray tube 1a over the emission time period, according to the set X-ray conditions. The X-ray detecting unit 3 generates an X-ray image on the basis of the detected X-rays. The X-ray detecting unit 3 outputs the generated X-ray image to the image data storing unit 9a. The image data storing unit 9a outputs the X-ray image to the image computing unit 9b and the display unit 10. The display unit 10 displays the X-ray image on the monitor 10d.

Step S202:

By employing the determining function 91, the processing circuitry of the image computing unit 9b performs an image processing process such as a segmentation process on the X-ray image. By performing an image processing process, the determining function 91 determines the target region in the X-ray image. Further, the determining function 91 further determines, within the target region, a region (the tip end section) including the tip end of the catheter and the high absorption region, by performing an image processing process on either the X-ray image or the target region.

Step S203:

By employing the calculating function 93, the image computing unit 9b sets the weights for the region obtained by excluding the high absorption region from the target region. In that situation, the determining function 91 determines the region to be used for calculating the statistical value, by excluding the 0-weight regions and the high absorption region from the target region.

Figure 3:
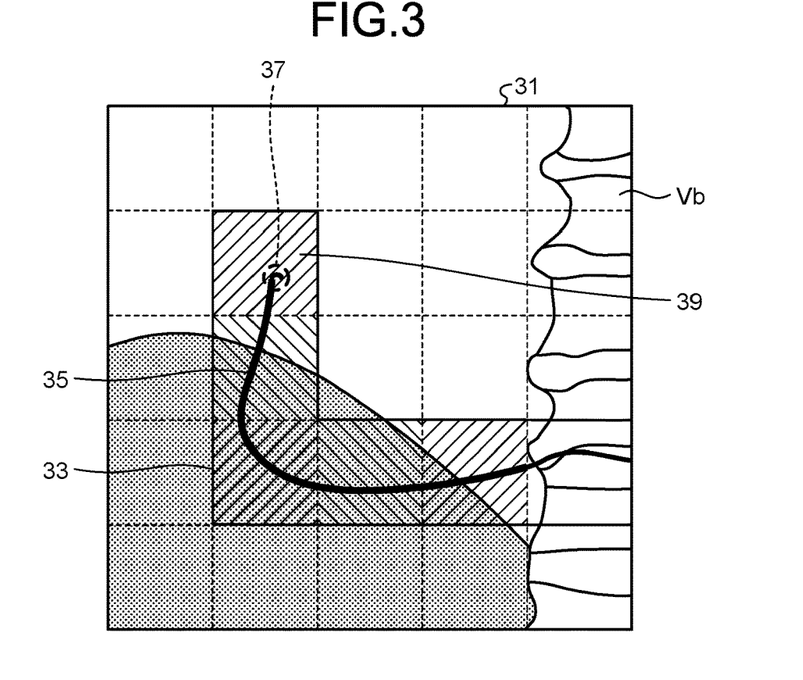
FIG. 3 is a drawing according to the embodiment illustrating examples of a target region and a catheter in an X-ray image.

FIG. 3 is a drawing illustrating examples of a target region 33 and a catheter 35 in an X-ray image 31. The grid squares indicated with the broken lies in FIG. 3 represent the plurality of sections. As illustrated in FIG. 3, the catheter 35 is detected across the six sections. The bold frame indicating the six sections including the catheter 35 corresponds to the target region 33. Further, as illustrated in FIG. 3, a region corresponding to the vertebral body Vb is determined across the five sections. The five sections including the vertebral body Vb correspond to the high absorption region. The region obtained by excluding the high absorption region from the L-shaped target region 33 is indicated with the diagonal hatching in FIG. 3. A region 39 indicated in FIG. 3 corresponds to the tip end section including the tip end 37 of the catheter.

Figure 4:
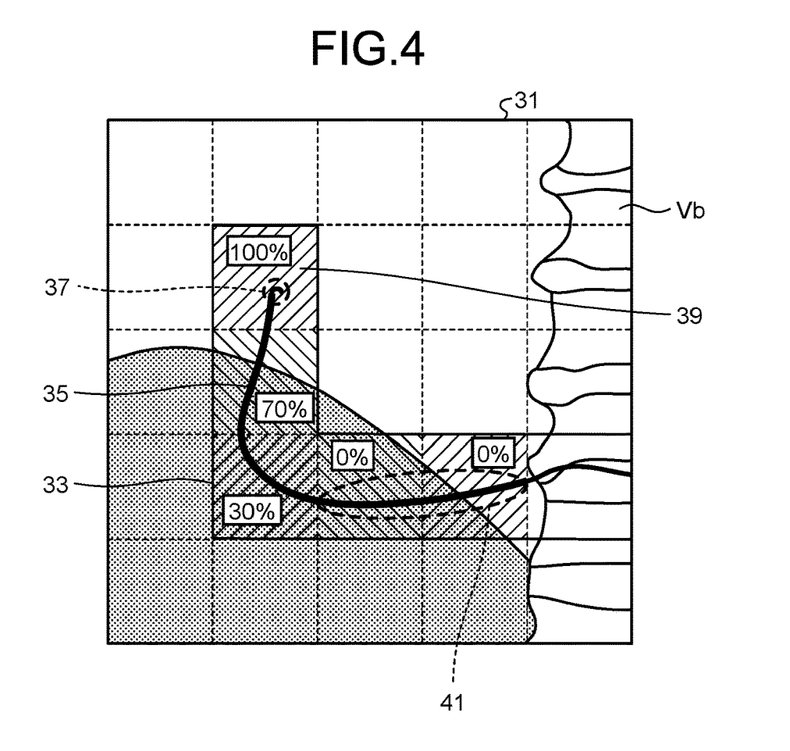
FIG. 4 is a drawing according to the embodiment illustrating examples of weights in the target region excluding a high absorption region.

FIG. 4 is a drawing illustrating examples of the weights in the target region 33 excluding the high absorption region. As illustrated in FIG. 4, for example, the calculating function 93 is configured to set a weight applied to the tip end section 39 including the tip end 37 of the catheter to be 100% and to set weights applied to the two base end sections including the base end 41 of the catheter to be 0%. Further, the calculating function 93 is configured to set weights for the range from the section positioned adjacent to the tip end section 39 to the section positioned adjacent to the base end sections, in such a manner that the weights gradually decrease from the tip end section 39 toward the base end sections. In this situation, the determining function 91 is configured to determine the calculation region, by excluding the 0-weight regions and the high absorption region from the target region 33. The calculating region illustrated in FIG. 4 includes the region corresponding to the 100% weight, the region corresponding to a 70% weight, and the region corresponding to a 30% weight.

Step S204:

By employing the calculating function 93, the image computing unit 9b calculates the statistical value related to the target region 33, by using the plurality of pixel values and the weights included in the target region 33. More specifically, the calculating function 93 calculates the statistical value related to the target region 33, by applying, to Expression (1), the weights and the pixel values in the target region (the calculation region) excluding the sections having the 0% weight and the high absorption region.

Step S205:

By employing the setting function 95, the image computing unit 9b compares the calculated statistical value with the threshold value. Subsequently, on the basis of a result of the comparison between the statistical value and the threshold value, the setting function 95 judges whether or not the X-ray conditions are to be changed. On the basis of the result of the comparison between the statistical value and the threshold value, when the setting function 95 determines that the X-ray conditions are to be changed (step S205: Yes), the process at step S206 will be performed. On the contrary, on the basis of the result of the comparison between the statistical value and the threshold value, when the setting function 95 does not determine that the X-ray conditions are to be changed (step S205: No), the X-ray conditions are maintained, and the process at step S207 will be performed.

Step S206:

By employing the setting function 95, the image computing unit 9b changes the X-ray conditions on the basis of the result of the comparison between the statistical value and the threshold value. In other words, the setting function 95 sets the X-ray conditions related to generating the X-rays on the basis of the statistical value. The emission of the X-rays thereafter will be carried out according to the X-ray conditions that have been changed.

Step S207:

When the X-ray imaging process for the patient P has not been finished (step S207: No), the processes at step S201 and thereafter will be repeatedly performed. On the contrary, when the X-ray imaging process for the patient P has been finished (step S207: Yes), the X-ray condition setting process ends.

In a modification example of the present embodiment, the X-ray condition setting process may be performed at a predetermined framerate related to generating the X-ray image. Further, in that situation, in response to moving of one or both of the holding arm 4 and the tabletop, the determining function 91 may be configured to re-determine the region corresponding to the target object. More specifically, in response to receipt of a moving instruction output from the system controlling unit 11 to the mechanism controlling unit 7, the determining function 91 may be configured to re-determine the region corresponding to the target object, by performing the image processing process on the X-ray image.

Further, in another modification example of the present embodiment, when the target object moves due to pulsation of the heart of the patient P in a plurality of X-ray images taken in a time series, the target region 33 may be determined by performing the following procedure: For example, the determining function 91 may be configured to determine a region corresponding to the target object by performing various types of image processing processes on an X-ray image corresponding to one of an end-systole phase and an end-diastole phase that are among electrocardiographic phases output from the electrocardiograph 8. Further, the determining function 91 may be configured to determine a region corresponding to the target object in each of the plurality of X-ray images by performing various types of image processing processes on the plurality of X-ray images taken in the time series. In that situation, the determining function 91 is configured to determine the region corresponding to the target object by superimposing regions determined in the plurality of X-ray images on one another. On such occasion, the high absorption region is excluded from the target region 33. As a result, the determining function 91 is configured to determine the region corresponding to the target object, so as to include a range of the moving of the target object in the plurality of X-ray images. In other words, when the position of the target object moves in the plurality of X-ray images taken in the time series, the determining function 91 is configured to determine the range in which the target object moves, as the region corresponding to the target object.

The X-ray diagnosis apparatus 100 according to the embodiment described above is configured to determine the region (the target region 33) corresponding to the target object in the X-ray image on the basis of the X-ray image; to calculate the statistical value related to the target region 33 on the basis of the plurality of pixel values included in the target region 33; and to set the X-ray conditions related to generating the X-rays on the basis of the calculated statistical value. For example, when the target object is a catheter, the X-ray diagnosis apparatus 100 may be configured to further determine the region (the tip end section) 39 including the tip end of the catheter on the basis of the X-ray image and to calculate the statistical value by using the weights that gradually decrease from the tip end 37 of the catheter 35 toward the base end of the catheter. Further, the X-ray diagnosis apparatus 100 is configured to determine, in the X-ray image, the region corresponding to the high absorption object that overlaps with the target object in the X-ray image and that has an X-ray absorption rate higher than the predetermined X-ray absorption rate and is configured to calculate the statistical value while excluding the region related to the high absorption object from the region related to the target object.

Consequently, by using the X-ray diagnosis apparatus 100 according to the present embodiment, it is possible to set the calculation region including the part of interest of the target object and excluding the high absorption region, as the region of interest related to the ABC scheme. In other words, by using the X-ray diagnosis apparatus 100, it is possible to calculate the statistical value related to the ABC scheme through the optimization by which the weights are applied to the region of interest in accordance with the presence of the interfering object (the high absorption objects such as a bone, teeth, any of various types of devices, etc.) overlapping with the target object related to the ABC scheme and clinical situations. As explained herein, by using the X-ray diagnosis apparatus 100, it is possible to realize the ABC scheme suitable for the region of interest in a real-time manner, by utilizing the anatomical information in accordance with the situation of the actual manipulation. By using the X-ray diagnosis apparatus 100, it is possible to decrease radiation exposure of the patient P by setting the X-ray conditions with an appropriate ABC scheme and to enhance image quality of the surroundings of the region of interest.

Further, when the position of the target object moves in the plurality of X-ray images taken in a time series, the X-ray diagnosis apparatus 100 according to the embodiment is configured to determine the range in which the target object moves, as the target region. For example, in response to moving of one or both of the holding arm 4 and the tabletop, the X-ray diagnosis apparatus 100 is configured to re-determine the target region and to re-calculate the statistical value on the basis of the plurality of pixel values included in the re-determined target region in response to the moving.

Further, when the target object moves due to pulsation of the heart of the patient P in the plurality of X-ray images taken in a time series, the X-ray diagnosis apparatus 100 is configured to determine the target region by performing the various types of image processing processes on the X-ray image corresponding to one of an end-systole phase and an end-diastole phase that are among the electrocardiographic phases output from an external biological signal measuring device such as the electrocardiograph 8. Accordingly, by using the X-ray diagnosis apparatus 100, it is possible to realize, in a real time manner, an ABC scheme that is most suitable for the region of interest, by utilizing the information obtained from a peripheral device of the X-ray diagnosis apparatus 100 such as the electrocardiograph 8 and the anatomical information, in accordance with situations of various types of actual manipulations (e.g., Percutaneous Coronary Intervention (PCI)) performed for the patient P. Consequently, it is possible to further decrease radiation exposure of the patient P and to further enhance image quality of the surroundings of the region of interest.

APPLICATION EXAMPLES

In an application example presented below, the target object includes, in addition to the catheter 35, one or both of a stent and a marker provided for a balloon. In this situation, a site of interest of the user may be set in advance as one of the stent and the balloon by using the operating unit 12. In the present application example, the determining function 91 is configured to further determine a region related to one of the stent and the marker, in the plurality of sections, by performing an image processing process on the X-ray image. Further, the calculating function 93 is configured to calculate a statistical value, by applying weights to the pixel values in the region related to the one of the stent and the marker. In the description below, to explain a specific situation, an example will be explained in which the target object includes the catheter 35 and a stent.

The determining function 91 is configured to detect the stent by applying an image processing process capable of detecting stents from X-ray images to the X-ray image, so as to determine a region (hereinafter, "stent region") related to the stent. The stent region is, for example, a region including at least a part of the external surface of the stent in the X-ray image. The image processing process to detect the stent is realized by using a known technique such as any of various types of segmentation processes, an image recognition process, or a trained model trained to detect stents (e.g., a trained neural network that realizes a semantic segmentation). More specifically, the determining function 91 is configured to determine the stent region from among a plurality of sections divided in advance in the X-ray image.

Figure 5:
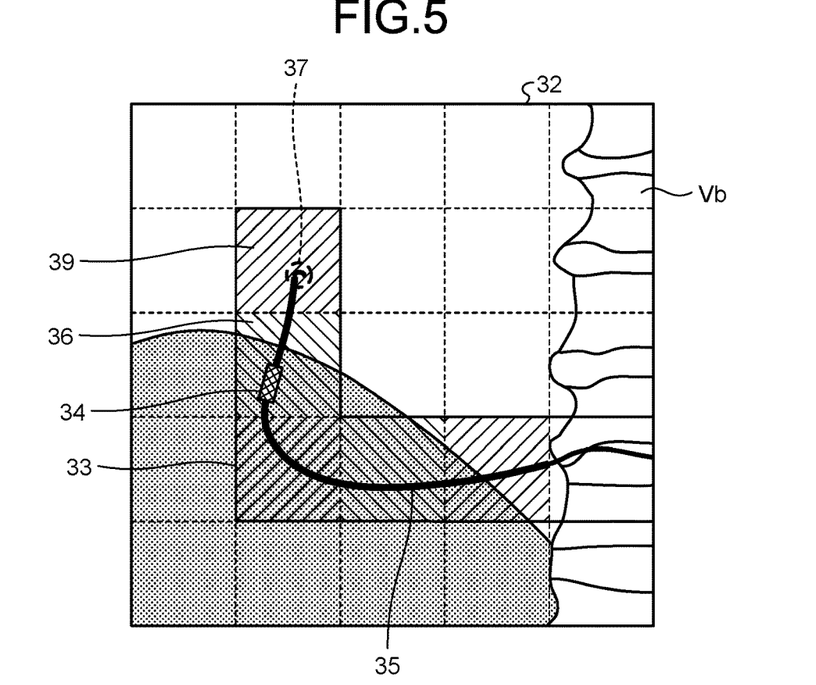
FIG. 5 is a drawing according to an application example of the embodiment illustrating examples of the target region, the catheter, and a stent in the X-ray image.

FIG. 5 is a drawing illustrating examples of the target region 33, the catheter 35, and a stent 34 in an X-ray image 32. As illustrated in FIG. 5, the catheter 35 is detected across the six sections. The bold frame indicating the six sections including the catheter 35 corresponds to the target region 33. Further, as illustrated in FIG. 5, the region corresponding to the vertebral body Vb is determined across the five sections. The five sections including the vertebral body Vb correspond to a high absorption region. The region obtained by excluding the high absorption region from the L-shaped target region 33 is indicated with the diagonal hatching in FIG. 5. The region 39 indicated in FIG. 5 corresponds to a tip end section including the tip end 37 of the catheter. Further, the stent 34 illustrated in FIG. 5 is positioned in a stent region 36 below the tip end section 39. In other words, the stent region 36 is positioned adjacent to the tip end section 39.

The calculating function 93 is configured to apply weights to the pixel values in the stent region 36 and to calculate a statistical value by using Expression (1). For example, the calculating function 93 is configured to set the pixel values in the stent region 36 with a weight larger a weight applied to the tip end section 39. More specifically, the calculating function 93 is configured to set the stent region 36 with a weight of 1, to set the tip end section 39 with a weight of 0.7, and to set the base end sections with a weight of 0. Further, in the region corresponding to the catheter 35, the calculating function 93 is configured to set weights for the range from the section positioned adjacent to the tip end section 39 to the section positioned adjacent to the base end sections, in such a manner that the weights gradually decrease from the tip end section 39 toward the base end sections.

Figure 6:
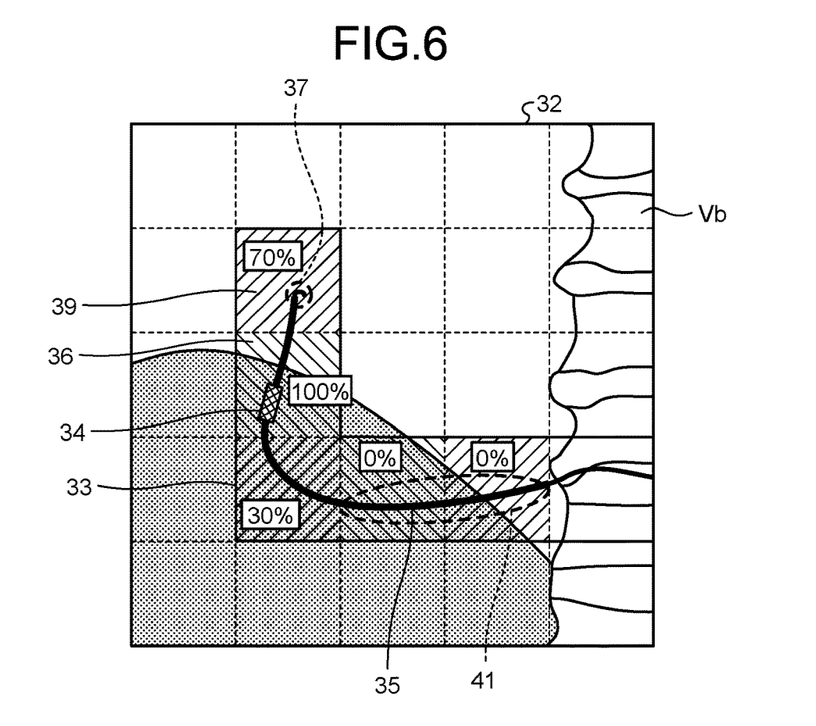
FIG. 6 is a drawing according to the application example of the embodiment illustrating examples of weights in the target region excluding the high absorption region.

FIG. 6 is a drawing illustrating examples of weights in the target region 33 excluding the high absorption region. As illustrated in FIG. 6, for example, the calculating function 93 is configured to set a weight applied to the stent region 36 including the stent 34 to be 100%, to set a weight applied to the tip end section 39 including the tip end 37 of the catheter to be 70%, and to set weights applied to the two base end sections including the base end 41 of the catheter to be 0%. Further, the calculating function 93 is configured to set weights for the range from the section positioned adjacent to the tip end section 39 to the section positioned adjacent to the base end sections in such a manner that the weights gradually decrease from the tip end section 39 toward the base end sections. In this situation, the determining function 91 is configured to determine a calculation region by excluding the 0-weight regions and the high absorption region from the target region 33. The calculation region in FIG. 6 includes the stent region 36 corresponding to the weight of 100%, the tip end section 39 corresponding to the weight of 70%, and a region corresponding to a weight of 30%.

The calculating function 93 is configured to calculate a statistical value related to the target region 33 by using a plurality of pixel values and the weights included in the target region 33. More specifically, the calculating function 93 is configured to calculate the statistical value related to the target region 33, by applying the weights and the pixel values in the calculation region to Expression (1). Because the processes in and after the statistical value calculation process are the same as those in the embodiment, explanations thereof will be omitted.

In a modification example of the present application example, the target object may be one or both of a blood vessel branch part and a lesion designated by the user. The lesion denotes a calcified region, for example. More specifically, the X-ray image is generated by using a contrast agent, for example, and displayed on the monitor 10d. In this situation, the determining function 91 is configured to determine regions related to the blood vessel branch part and the calcified range by performing an image processing process on the X-ray image. As a result, in the X-ray image displayed on the monitor 10d, the branch part and the calcified range are displayed while being emphasized. When the user designates one or both of the blood vessel branch part and the calcified range via the operating unit 12, the calculating function 93 is configured to set a weight applied to the region including the one or both of the blood vessel branch part and the calcified range to be 1 being a maximum value, similarly to the stent region 36 in the modification example. In this manner, the calculating function 93 is configured to calculate the statistical value by applying the weights to the pixel values in the region related to one of the branch part and the lesion. Because the other processes are the same as those in the present application example, explanations thereof will be omitted.

When the target object further includes one or both of the stent and the marker provided for the balloon in addition to the catheter 35, the X-ray diagnosis apparatus 100 according to the embodiment described above is configured to further determine the region related to one of the stent and the marker and to calculate the statistical value by applying the weights to the pixel values in the region related to the one of the stent 34 and the marker. Further, while the target object includes one or both of the blood vessel branch part and the lesion designated by the user, the X-ray diagnosis apparatus 100 is configured to further determine the region related to one of the branch part and the lesion and to calculate the statistical value by applying the weights to the pixel values in the region related to the one of the branch part and the lesion.

Consequently, by using the X-ray diagnosis apparatus 100, it is possible to implement an appropriate ABC scheme, in accordance with a body site and a device or the like on which the user is focused. Because the other advantageous effects are the same as those in the embodiment, explanations thereof will be omitted.

When technical concepts of the present embodiments are realized as an X-ray condition setting method, the X-ray condition setting method includes: determining a region corresponding to a target object in an X-ray image, on the basis of the X-ray image; calculating a statistical value related to the region, on the basis of a plurality of pixel values included in the determined region; and setting an X-ray condition related to generating X-rays on the basis of the calculated statistical value. Because the processing procedure corresponding to the X-ray condition setting method corresponds to the processing procedure in the X-ray condition setting process, explanations thereof will be omitted. Further, because advantageous effects of the X-ray condition setting method are the same as those of the embodiments, explanations thereof will be omitted.

According to at least one aspect of the embodiments, the modification examples, the application examples, and the like, it is possible to set the X-ray conditions that make it possible to reduce the radiation exposure and to enhance the image quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray diagnosis apparatus comprising a processing circuitry configured:
   to determine a region corresponding to a target object in an X-ray image, on a basis of the X-ray image;
   to calculate, on a basis of a plurality of pixel values included in the region, a statistical value related to the region by applying weights to the plurality of pixel values; and
   to set an X-ray condition which is related to electric power supplied to an X-ray tube for generating X-rays, on a basis of the statistical value.

2. The X-ray diagnosis apparatus according to claim 1, wherein
   the target object is a catheter,
   the processing circuitry is configured to further determine a region including a tip end of the catheter, and
   the weights gradually decrease from the tip end toward a base end of the catheter.

3. The X-ray diagnosis apparatus according to claim 2, wherein, when the target object includes, in addition to the catheter, one or both of a stent and a marker provided for a balloon, the processing circuitry is configured to further determine a region related to one of the stent and the marker and to calculate the statistical value by applying a weight to pixel values in the region related to the one of the stent and the marker.

4. The X-ray diagnosis apparatus according to claim 1, wherein, when the target object is one or both of a blood vessel branch part and a lesion designated by a user, the processing circuitry is configured to further determine a region related to one of the branch part and the lesion and to calculate the statistical value by applying a weight to pixel values in the region related to the one of the branch part and the lesion.

5. The X-ray diagnosis apparatus according to claim 1, wherein
   the processing circuitry is configured to re-determine the region, in response to moving of one or both of: a holding arm configured to movably hold the X-ray tube that generates the X-rays and an X-ray detector that is positioned opposite the X-ray tube and detects the X-rays; and a tabletop on which an examined subject is placed,
   the processing circuitry is configured to re-calculate the statistical value on a basis of a plurality of pixel values included in the region re-determined in response to the moving, and
   the processing circuitry is configured to set the X-ray condition on a basis of the re-calculated statistical value.

6. The X-ray diagnosis apparatus according to claim 1, wherein
   the processing circuitry is configured to determine, in the X-ray image, a region corresponding to a high absorption object that overlaps with the target object in the X-ray image and that has an X-ray absorption rate higher than a predetermined X-ray absorption rate, and
   the processing circuitry is configured to calculate the statistical value by excluding a region related to the high absorption object from a region related to the target object.

7. The X-ray diagnosis apparatus according to claim 1, wherein, when the target object moves due to pulsation of a heart of an examined subject in a plurality of X-ray images including the X-ray image and taken in a time series, the processing circuitry is configured to determine the region corresponding to the target object, by performing various types of image processing processes on an X-ray image corresponding to one of an end-systole phase and an end-diastole phase that are among electrocardiogram an electrocardiograph.

8. The X-ray diagnosis apparatus according to claim 1, wherein, when a position of the target object moves in a plurality of X-ray images including the X-ray image and taken in a time series, the processing circuitry is configured to determine a range in which the target object moves, as the region corresponding to the target object.

9. The X-ray diagnosis apparatus according to claim 1, wherein the X-ray condition includes at least one of a tube voltage and a current-time product of a tube current applied to the X-ray tube.

10. An X-ray condition setting method comprising:
    determining a region corresponding to a target object in an X-ray image, on a basis of the X-ray image;
    calculating, on a basis of a plurality of pixel values included in the region, a statistical value related to the region by applying weights to the plurality of pixel values; and
    setting an X-ray condition which is related to electric power supplied to an X-ray tube for generating X-rays, on a basis of the statistical value.

11. The X-ray condition setting method according to claim 10, wherein,
    the target object is a catheter,
    the X-ray condition setting method comprises further determining a region including a tip end of the catheter, and
    the weights gradually decrease from the tip end toward a base end of the catheter.

12. The X-ray condition setting method according to claim 11, wherein, when the target object includes, in addition to the catheter, one or both of a stent and a marker provided for a balloon, the X-ray condition setting method comprises: further determining a region related to one of the stent and the marker; and calculating the statistical value by applying a weight to pixel values in the region related to the one of the stent and the marker.

13. The X-ray condition setting method according to claim 10, wherein, when the target object is one or both of a blood vessel branch part and a lesion designated by a user, the X-ray condition setting method comprises: further determining a region related to one of the branch part and the lesion; and calculating the statistical value by applying a weight to pixel values in the region related to the one of the branch part and the lesion.

14. The X-ray condition setting method according to claim 10, comprising:
   re-determining the region, in response to moving of one or both of: a holding arm configured to movably hold the X-ray tube that generates the X-rays and an X-ray detector that is positioned opposite the X-ray tube and detects the X-rays and a tabletop on which an examined subject is placed;
   re-calculating the statistical value on a basis of a plurality of pixel values included in the region re-determined in response to the moving; and
   setting the X-ray condition on a basis of the re-calculated statistical value.

15. The X-ray condition setting method according to claim 10, comprising:
   determining, in the X-ray image, a region corresponding to a high absorption object that overlaps with the target object in the X-ray image and that has an X-ray absorption rate higher than a predetermined X-ray absorption rate; and
   calculating the statistical value by excluding a region related to the high absorption object from a region related to the target object.

16. The X-ray condition setting method according to claim 10, wherein, when the target object moves due to pulsation of a heart of an examined subject in a plurality of X-ray images including the X-ray image and taken in a time series, the X-ray condition setting method comprises determining the region corresponding to the target object, by performing various types of image processing processes on an X-ray image corresponding to one of an end-systole phase and an end-diastole phase that are among electrocardiographic phases output from an electrocardiograph.

17. The X-ray condition setting method according to claim 10, wherein, when a position of the target object moves in a plurality of X-ray images including the X-ray image and taken in a time series, the X-ray condition setting method comprises determining a range in which the target object moves, as the region corresponding to the target object.

* * * * *